(12) United States Patent
Bekkevold

(10) Patent No.: US 7,891,713 B2
(45) Date of Patent: Feb. 22, 2011

(54) PIPE CLAMP

(75) Inventor: Knut Håvard Bekkevold, Hof (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 223 days.

(21) Appl. No.: 11/596,947

(22) PCT Filed: May 24, 2005

(86) PCT No.: PCT/NO2005/000171

§ 371 (c)(1),
(2), (4) Date: Mar. 11, 2008

(87) PCT Pub. No.: WO2005/116505

PCT Pub. Date: Dec. 8, 2005

(65) Prior Publication Data

US 2008/0265568 A1    Oct. 30, 2008

(30) Foreign Application Priority Data

May 26, 2004    (NO)    .................................. 20042175

(51) Int. Cl.
*F16L 23/04*    (2006.01)
*F16L 23/08*    (2006.01)

(52) U.S. Cl. ........................ 285/406; 285/410; 285/411; 285/420

(58) Field of Classification Search ................. 285/406, 285/407, 409, 410, 411, 412, 413, 420, 421
See application file for complete search history.

(56) References Cited

U.S. PATENT DOCUMENTS

| | | | | |
|---|---|---|---|---|
| 1,966,039 A | * | 7/1934 | Muchnic | 285/135.5 |
| 3,026,128 A | * | 3/1962 | Willis | 285/18 |
| 3,231,297 A | * | 1/1966 | Watts et al. | 285/24 |
| 3,515,416 A | * | 6/1970 | Pickert | 285/413 |
| 4,191,410 A | * | 3/1980 | Voituriez et al. | 285/367 |
| 4,730,850 A | * | 3/1988 | Takahashi | 285/3 |
| 5,509,702 A | * | 4/1996 | Warehime et al. | 285/409 |
| 5,513,228 A | * | 4/1996 | Malmasson | 376/203 |
| 5,645,303 A | * | 7/1997 | Warehime et al. | 285/409 |
| 5,675,873 A | | 10/1997 | Groess | |
| 6,003,548 A | * | 12/1999 | Muchow | 137/614.05 |
| 6,030,006 A | | 2/2000 | Lin | |
| 6,050,615 A | * | 4/2000 | Weinhold | 285/409 |
| 6,499,773 B1 | * | 12/2002 | Ostergaard | 285/408 |

(Continued)

FOREIGN PATENT DOCUMENTS

DE    841 251    6/1952

(Continued)

*Primary Examiner*—James M Hewitt

(57) ABSTRACT

A pipe clamp includes two clamping members which are hinged together at one end and releasably secured together at the other end. The clamping members each comprising an arcuate, radially inner portion which extends in the longitudinal direction of the clamping member and which in profile comprises a bottom portion and two lips which each extend radially inwardly from a corresponding side of the bottom portion. Each lip includes a main portion which extends circumferentially along the inner portion, and at least one lip of at least one clamping member comprises an arcuate circle sector portion which extends between the main portion and an end of the clamping member. In addition, the main portion comprises a lip radius and the circle sector portion comprises a circle sector radius that is larger than the lip radius.

13 Claims, 7 Drawing Sheets

U.S. PATENT DOCUMENTS

| | | |
|---|---|---|
| 6,533,333 B1 | 3/2003 | Radzik |
| 6,672,631 B1 * | 1/2004 | Weinhold .................. 285/409 |
| 6,708,377 B2 * | 3/2004 | Maunder .................... 24/279 |
| 6,896,301 B2 * | 5/2005 | Brice ........................ 285/364 |

FOREIGN PATENT DOCUMENTS

| | | |
|---|---|---|
| DE | 29 11 575 C2 | 9/1980 |
| DE | 30 38 491 C2 | 4/1982 |
| EP | 566287 A1 * | 10/1993 |
| FR | 2 775 753 A1 | 9/1999 |
| GB | 2 051 213 A | 1/1981 |
| GB | 2 098 297 A | 11/1982 |

\* cited by examiner

PIPE CLAMP

BACKGROUND OF THE INVENTION

The invention relates to a pipe clamp for securing together, for example, two pipes or one pipe and an end cover. The pipe clamp comprises two clamping members that are hinged at one end and comprise a securing device at the other end.

There exists a multitude of pipe clamps for securing together two pipe ends. For example, DE 2911575 describes a type of pipe clamp comprising an outer clamping member consisting of two parts that are hinged together at one end and comprise a securing device at the other end. Two abutting elements are arranged inside the clamping member. The abutting elements are moved relative to the clamping member when it is closed. It is also disclosed that there may be another securing device instead of a hinge. DE 3038491 also describes a clamp device for securing together two pipe ends which, for example, may be in two halves that are either hinged together or have two securing devices.

Pipe clamps for large pipes are available on the market, the pipe clamp in this case having to withstand substantial forces and consisting of three parts which are hinged together at two points and comprise a securing device at the third point. These clamps are made in three parts in order to overcome a number of disadvantages encountered in two-part clamps.

Pipe clamps in two parts, where the parts are configured as pure circular arcs that are hinged at one end and have a securing device at the other, require that the clamp be opened wide to enable a pipe with end hub to be inserted into the pipe clamp. This may mean that the securing device must also be placed further out from a centre point of the pipe clamp. The insertion of a pipe end and the opening of the clamp are a problem area, and therefore many clamps with two parts are made with securing devices at both ends. This means that there are two devices that must be secured together, and for a clamp that is fitted, for example, under water, this is a cost-increasing factor. It is also a cost-increasing factor in the production of the clamp. Alternatively, the number of parts in the clamp can be increased. When a pipe clamp consisting of two parts configured as pure circular arcs is to be closed, the end points of the circular arcs will meet the pipe hub first. This results in a point contact, and with large clamps that must withstand substantial forces, the point will tend to dig into the contact face and this may result in the clamp not being able to form the desired connection.

When using clamps under water, it is also a problem that the clamp cannot be fully open, that is to say that the pipe ends must be inserted into the clamp from the side of the clamp, whilst it is a great advantage if there is only one element that must be actuated to open and close the clamp. This means to say that the clamp must consist of parts which are drawn apart on opening, whilst there is an element that holds them together for the closing and opening of the clamp. For the clamp to be opened wide, the securing device must be placed further away from a centre point of the clamp so as not to obstruct the insertion of the pipe ends. This results in a less advantageous clamp with an unfavourable distribution of forces.

In particular for use under water, it is desirable that the clamp should be capable of being closed in a simple manner and with great force, partly so that the clamp may straighten out possible angular differences between the two hubs that are to be secured together. (With hub it is meant the hub part of a hubbed flange.)

One of the objects of the present invention is to provide a pipe clamp consisting of two pipe clamp parts which are hinged at one end and comprise a securing device at the other end, and which overcomes the aforementioned disadvantages of known pipe clamps.

It is an object to provide a pipe clamp that does not need to be opened as wide as previously known pipe clamps, whilst the securing device is in a favourable position. It is a further object to avoid point contact between the clamp and the pipe hub during closing of the clamp.

It is also an object to provide a pipe clamp which can be closed with such great force that any angle between the pipe hub ends is straightened by the clamp.

The aforementioned objects are obtained by a pipe clamp as disclosed in the claims below.

SUMMARY OF THE INVENTION

The pipe clamp according to the invention is to be used for securing together hub end portions of, for example, pipes. It is also possible for the clamp to be used for securing together a pipe and an end cover. The pipes, or the pipe and the end cover which are to be secured together have a centre axis. The pipe clamp also has a centre axis coincident with the centre axis of the pipe when the pipe clamp is in a closed position. The pipe clamp according to the invention comprises two clamping members of a substantially circular arc configuration which at one end are fastened to each other pivotably about an axis substantially parallel to the centre axis of the pipe, and which at the other end comprise a securing device. The clamp is designed to press the hub end portions against each other when the clamping members are secured together.

The clamping member is made having an interior form extending in the longitudinal direction of the circular arc, comprising a bottom portion having a bottom portion radius, a lip on each side of the bottom portion having an inner lip radius, and obliquely oriented contact faces running from the lip towards the bottom portion at an angle Z and 180-Z, respectively, to the centre axis of the pipe.

These contact faces will, when the clamp has been closed, rest against corresponding contact faces on the hub end portions of the pipes, so that the hub end portions are pressed against each other, alternatively that a pipe and an end cover are pressed against each other.

According to a first aspect of the invention, the clamping member is so configured that the clamp, at least in a portion thereof, has a different shape than the rest of the clamping member, which in a fully open position has the purpose of increasing the clearance between the clamping member and the pipe end hub.

According to a preferred embodiment of the invention, the lips of the clamping member, at least in a circular sector portion extending essentially from one end, are configured with a circular sector radius greater than the lip radius. A centre point for the circular sector radius when the pipe clamp is in a fully open position lies essentially on the centre axis of the pipe. This means that the hub end portions can be inserted into the clamp by opening the clamp to a lesser extent than had the clamp not had a modified radius at least in a circular sector.

An alternative solution is to form circular sector portions with straight cut-offs, whose orientation is a right angles relative to a radius extending out from the centre axis of the pipe. Other forms of the cut-off are also conceivable, for example, several successive straight cut-offs in a circular sector portion.

In a preferred embodiment of the clamp, the clamping member is further configured with a circular sector having a circular sector radius extending from the opposite end of the clamping member relative to the first end, and the circular sector radius for both circular sectors is the same. It is of course possible to have an embodiment with just one circular sector, and this sector would then most naturally be positioned at the hinged end of the clamp. It is also conceivable that the circular sectors are configured with different diameters.

In the preferred embodiment, the circular sector at the hinge point forms an angle of between 10 and 35 degrees, preferably 25 degrees, and the circular sector at the securing end forms an angle of between 5 and 25 degrees, preferably 15 degrees.

According to a second aspect of the invention, the clamping member in an open position is configured with a clamp contact radius that is a greater radius than a hub contact radius. These radii are radii relative to an imaginary point in the contact face between the clamp and the pipe end hub.

In the preferred embodiment of the invention, the transition between the lip and the oblique contact face is configured with a rounding-off radius, preferably in the range of 60 to 20 mm, most preferably 40 millimeters.

In the case with circular sectors having varying radii, the transition, in the preferred embodiment, between the lip and the oblique contact face seen in a radial direction from the centre axis towards a part including a transition from lip radius to circular sector radius, projected on a plane at right angles to the radius, will form an apparent straight line. When the clamp is closed, this gives that a contact line is obtained between the clamp and the hub, and not a contact point. This is highly advantageous.

In a preferred embodiment, at least one of the lips comprises, at the side facing out from the clamp, from a radially inner point of the lip, an obliquely extending guide face which forms an angle in the range of 15-65 degrees, preferably 30. By means of a guide face of this kind, the hub portion of the pipe will be able to slide into the clamp and thus also be centred on insertion. In the preferred embodiment, the circle sectors, at least, have a guide face, and it preferably also extends slightly beyond the circular sectors with a circular sector radius on the lip and onto the lip having the lip radius.

A clamp that is made according to the invention with circular sector radii close to the ends provides a two-piece clamp hinged at one end that does not need to be opened as wide for the insertion of the hub portions of the pipes as existing clamps. The guide faces also mean that the hub portions can be centred and inserted into the clamp with some force. The rounding off of the lip and the rounding off of the curve of the rounding off of the lip in the transition from a lip radius to a circular sector radius, together with the fact that the clamp contact face radius is greater than the hub contact face radius, means that the clamp can be closed with great force without damaging the contact faces, and the clamp can be closed even if the pipes are not fully centred, since the clamp with the said configuration will pull them to the centre. This means that the clamp according to the invention provides substantial advantages over the known clamps.

BRIEF DESCRIPTION OF THE DRAWINGS

The present invention will now be explained in more detail with reference to the figures which illustrate a non-limiting example of the invention, wherein.

DETAILED DESCRIPTION OF THE INVENTION

Figure 1:
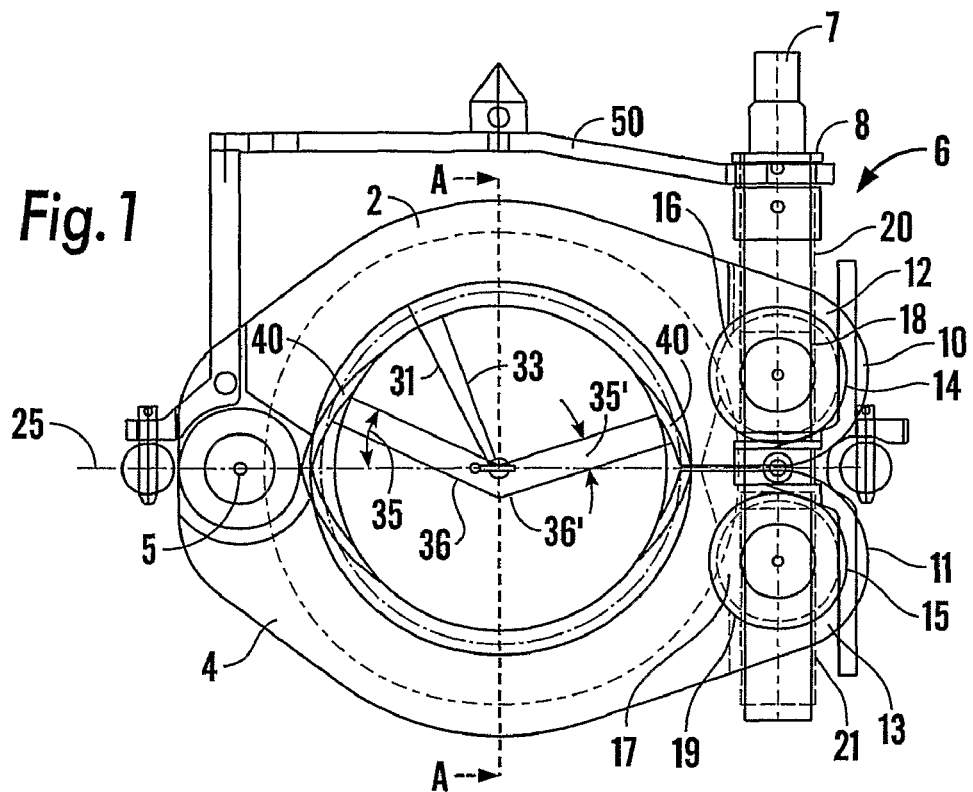
FIG. 1 shows a pipe clamp according to the invention in a closed position.
Figure 2:
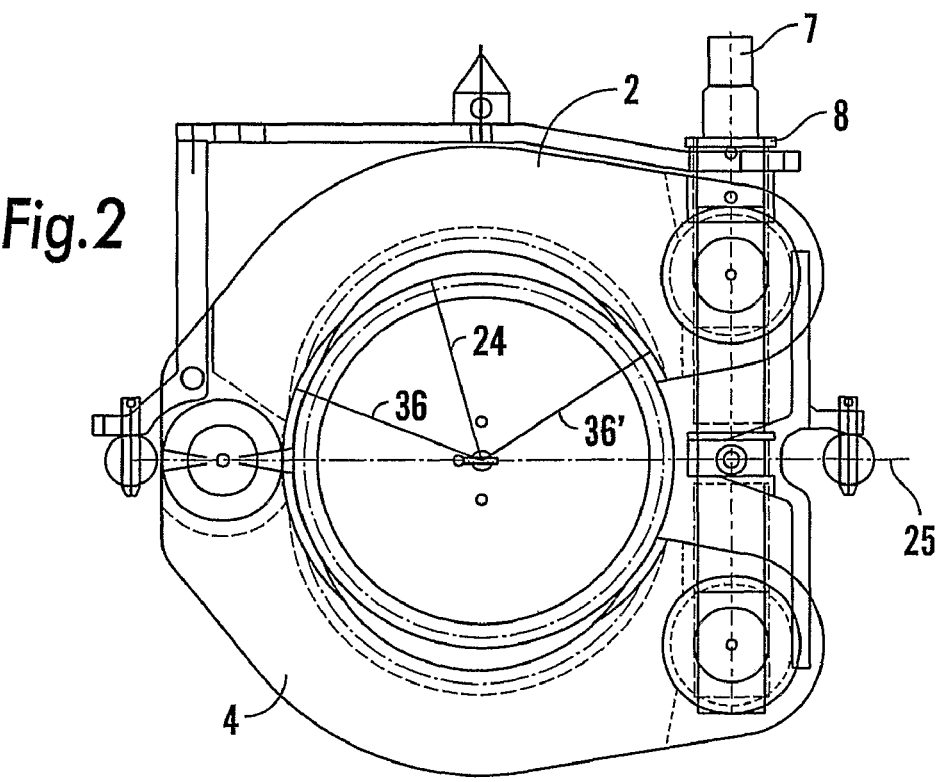
FIG. 2 shows the pipe clamp of FIG. 1 in an open position.
Figure 3:
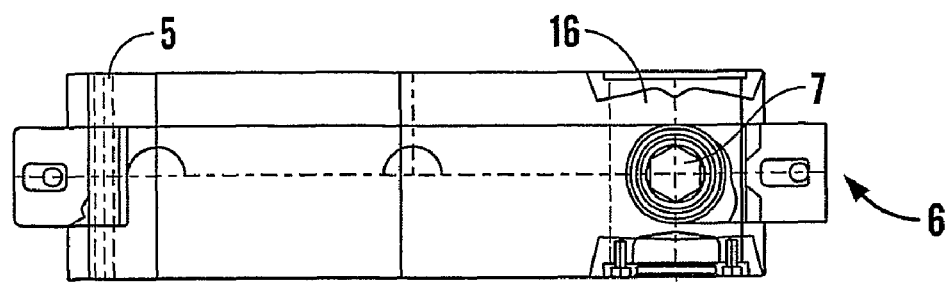
FIG. 3 is a top view of the pipe clamp in FIG. 1.

The pipe clamp according to the invention comprises, as shown in FIG. 1 in a closed position, in FIG. 2 in an open position and from above in FIG. 3, a first pipe clamping member 2 and a second pipe clamping member 4. The clamping members 2, 4 are at one end fastened to each other with a hinge 5 so that they are pivotable about an axis of rotation from a closed to an open position and vice versa. At their other end the clamping members 2, 4 comprise a securing device 6. The securing device 6 is basically prior art and will only be explained briefly here. At one end thereof, the clamping members 2, 4 comprise lugs 10, 11. In these lugs 10, 11 there are provided throughgoing holes 14, 15 which extend substantially parallel to the axis of rotation. In a plane at right angles to the axis of rotation, there is provided a slot 12 and 13, respectively, in lug 10, 11. A bolt 7 is provided which extends through both slots 12, 13. Provided in the holes 14, 15 are threaded bolts 16, 17 which have an internal threaded bore 18, 19 extending in the same plane as the slots 12, 13. The threaded bores 18, 19 cooperate with respective threaded portions 20, 21 arranged on the bolt 7. By giving respective threaded portions left and right threaded threads respectively, the clamp can be opened or closed by turning the bolt 7. The slots 12, 13 may be throughgoing holes. The locking bolt is equipped with a device for cooperating with a rotary tool. The securing device is made so that it distinctly indicates a fully open position of the securing device and thus the pipe clamp. This may, for example, be done by arranging an end stop, for example, a locking nut on the bolt 7, against which the device stops when the bolt 7 is turned.

Figure 4A:
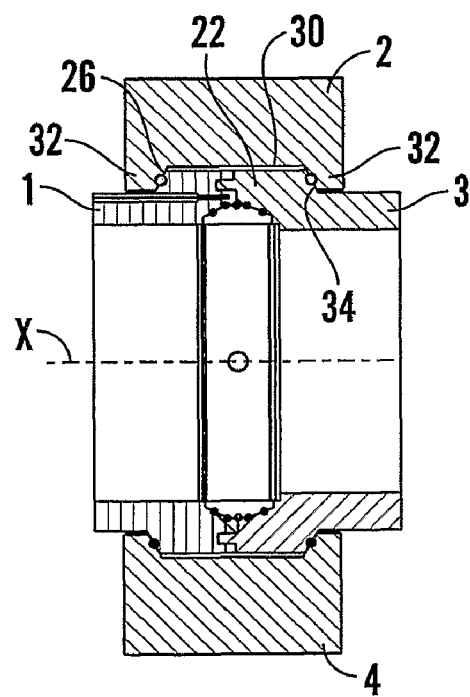
FIG. 4 is sectional view through the pipe clamp in FIG. 1 taken along the line A-A.
FIG. 4b shows a detail section of FIG. 4.

As shown in FIG. 4, which is a cross-section of the clamp along the line A-A in FIG. 1, the clamping member has an interior form in the longitudinal direction of the clamping member which comprises a bottom portion 30, two lips 32 which lie on each side of the bottom portion 30, and two obliquely oriented contact faces 34 which extend from the bottom portion 30 to an outer point of the lips 32. The pipes that are to be secured together, 1 and 3 respectively, comprise hub portions 22. The hub portion has an obliquely oriented hub contact face 26 which extends around the whole pipe and which faces away from the hub portion 22 of the other pipe. The hub contact face 26 will, when the clamp is closed, rest against the contact face 34 of the clamp and these faces will have a complementary configuration and press the pipe ends against each other.

As can be seen from FIG. 1, the clamping member 2 has an inner lip radius 33 and a bottom portion radius 31.

The clamping member 2 is also configured with two circular sector portions 35, 35'. These circular sector portions 35, 35' have, for the lips in the circular sector, a circular sector radius 36, 36' that is greater than the lip radius 33. The centre point for the circular sector radii 36, 36' is on or in proximity to the centre axis of the pipe when the clamp is in a fully open position, as shown in FIG. 2. This means that the pipe can more easily be inserted into the clamp and at the same time be centered relative to each other during the joining process.

The clamping member 2, 4 is also configured with an outward facing guide face 40, on which the pipe hub slides on insertion of the pipe into the clamp. The guide face 40 extends across the circular sector portions 35, 35' having the circular sector radius 36, 36' and some way along the portion that has a lip radius 33.

Figure 4B:
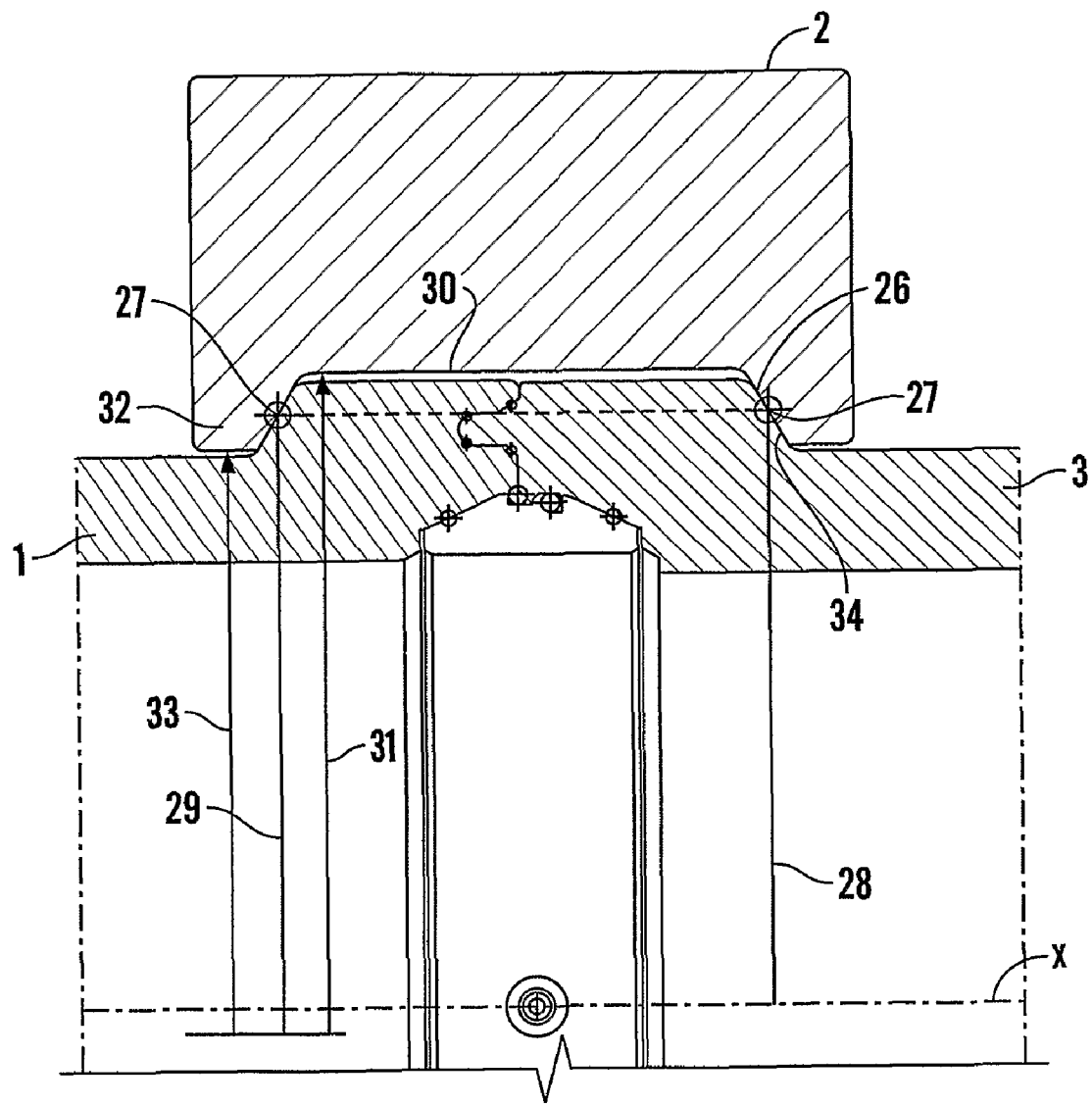

As also can be seen from FIG. 4B, the clamping member 2 and the pipe hub end 3 have contact faces 34 and 26, respectively, which rest against each other when the clamp is in a closed position. A point 27 on the contact faces 34, 26 is an imaginary contact point which, during the closing of the clamp, forms an essentially circumferential contact line. The point 27 has, for the clamp, a clamp contact radius 29 and, for the pipe hub end, a hub contact radius 28. The clamp contact radius 29 is greater than the hub contact radius 28. The centre point for the hub contact radius 28 is on the centre axis X of the pipe.

Figure 5:
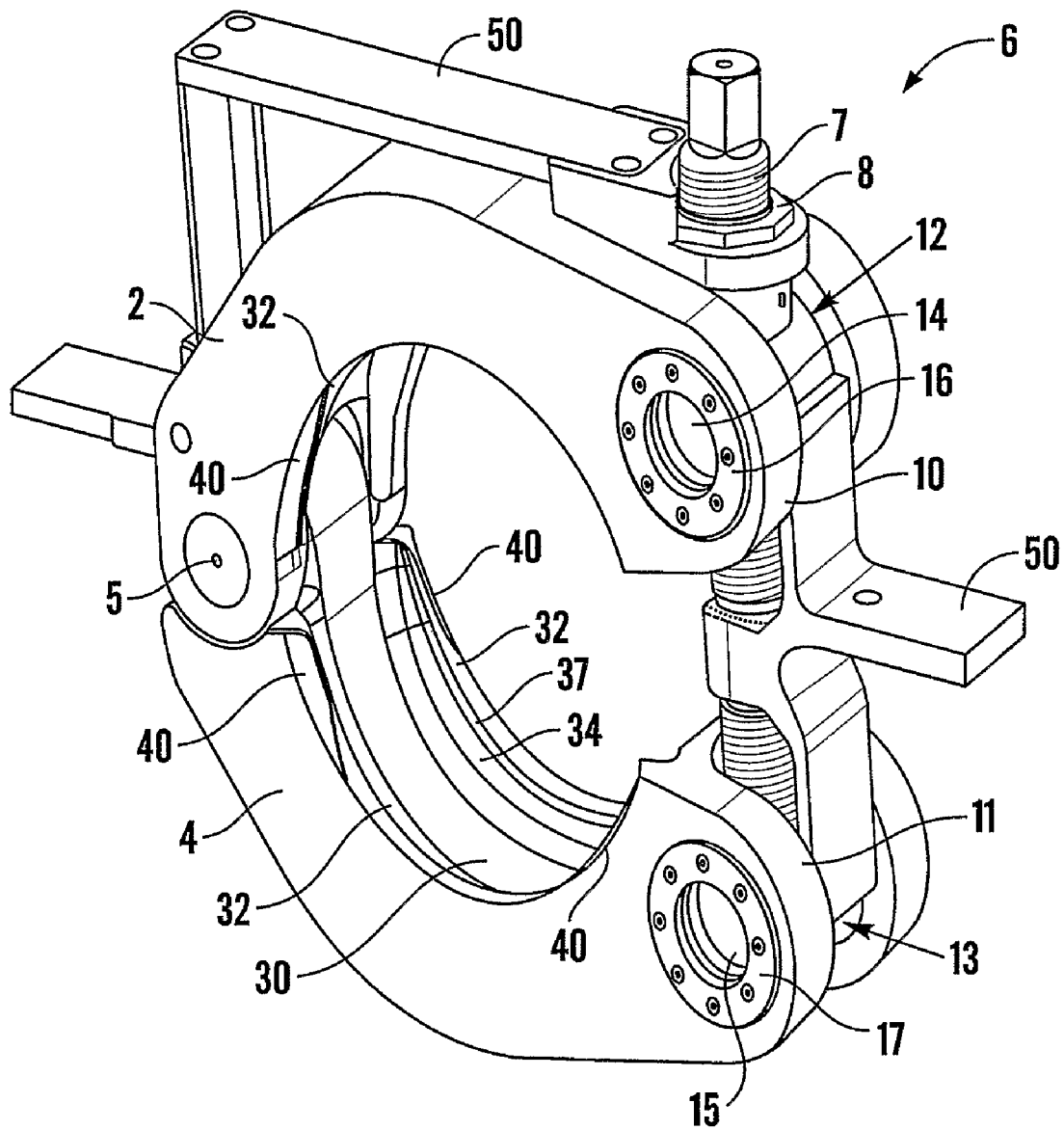
FIG. 5 is a perspective view of the pipe clamp according to the present invention.

FIG. 5 shows a perspective view of the clamp in FIGS. 1-4. An external orientation device 50 is also indicated in the figure. This device is used to hold the clamp relative to a tool which is used to open or close the clamp.

Figure 6:
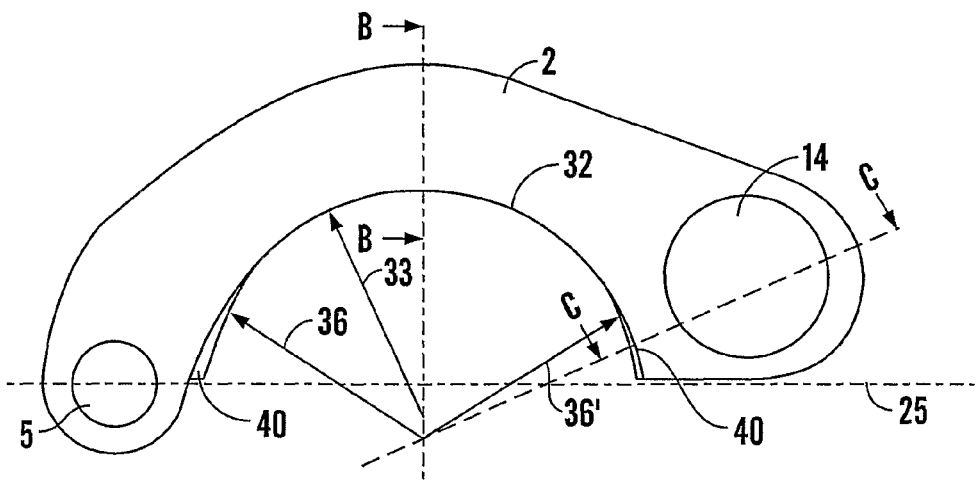
FIG. 6 is a side view of a pipe clamping member of the pipe clamp shown in FIG. 5.

FIG. 6 is a side view of the clamping member 2. The clamping member 2 has a hinge end, with hinge device 5 and a securing end with a hole 14 through which a part of the securing device is to be passed. As previously mentioned, the clamping member 2 has a lip radius 33, and the lip radius 33 goes over into the circular sector portion 35, at the hinge end, and into in a circular sector radius 36 that is greater than the lip radius 33, and in the circular sector portion 35' at the securing end into a circular sector radius 36'. In the illustrated embodiment the two circular sector radii 36, 36' are identical, and have a centre point that is on the other side of the mirror plane 25 relative to the clamping member 2 when the clamp is in a closed position (FIG. 1). The centre point for the circular sector radii 36, 36' will be in the centre point for the pipe end hub when the clamp is in a fully open position (FIG. 2).

In the illustrated example, the clamping member 2 also has obliquely oriented guide faces 40, which cover the circular sector portions where the lip has a circular sector radius 36, 36', and which also project some way inwards on the clamping member 2 where the lip has a lip radius 33. The guide faces 40 help to orient the pipe hub when it is inserted into the clamp.

Figure 7:
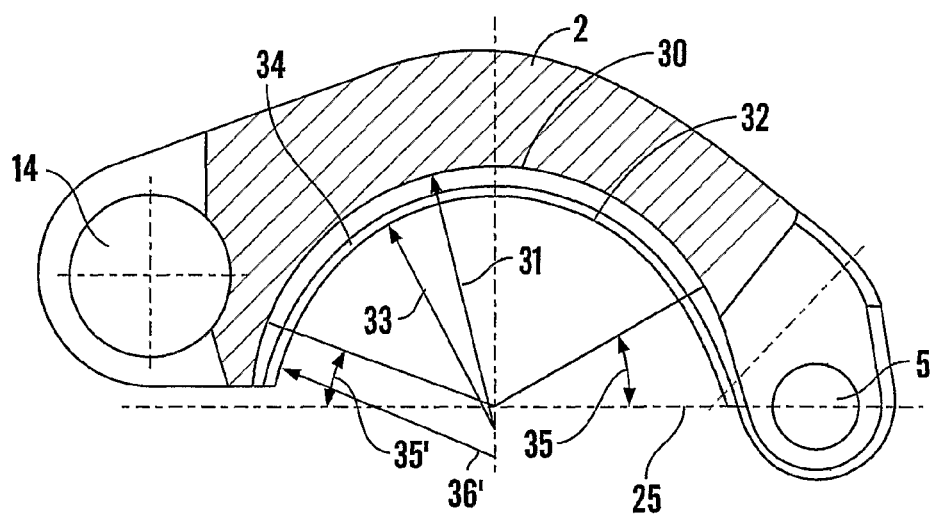
FIG. 7 is a longitudinal sectional view of the pipe clamping member shown in FIG. 6.

FIG. 7 is a longitudinal cross-sectional view of the clamping member 2 illustrated in FIG. 6, but shown mirror-inverted, with the securing end with hole 14 and the hinge end with hinge 5. As mentioned above, it can be seen from the figure that the clamping member 2 has an interior profile which extends in the longitudinal direction of the clamping member 2, with a bottom portion 30 having a bottom portion radius 31 which extends the entire length of the clamping member 2. Furthermore, it has a lip 32 which essentially has a lip radius 33, but which in two circular sector portions 35, 35', one 35 close to the hinge end and one 35' close to the joining end, has a greater radius, circular sector radius 36', than the lip radius 33. The centre point for the circular sector radii 36, 36' and the lip radius 33 are at different points.

There are two circular sectors in this embodiment, but it is conceivable that the clamping member can be made having just one circular sector portion with a circular sector radius for the lip which is different from the lip radius. In the case with just one circular sector portion, this portion will advantageously be in proximity to the hinge end.

This may be seen indirectly from FIG. 7, since the circular sector portion 35, in proximity to the hinge end forms an angle of about 25 degrees, which is greater than the circular sector portion 35' which forms an angle of about 15 degrees.

Figure 8:
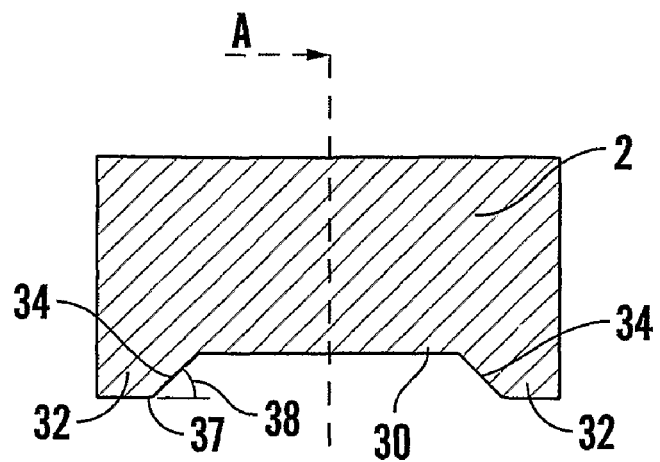
FIG. 8 is a sectional view taken along the line B-B of the pipe clamping member shown in FIG. 6.

FIG. 8 is a sectional view along the line B-B in FIG. 6 and shows a section of the clamping member 2, where the lip 32 has a lip radius that is not greater than the circular sector radius. It can be seen that the interior profile of the clamping member 2 comprises a bottom portion 30 with a lip 32 on each side of the bottom portion 30. The transition between the bottom portion 30 and an inner point of the lips 32 is made in the form of obliquely oriented contact faces 34. The oblique orientation of the contact faces forms an angle 38 with the centre axis of the clamp. This oblique orientation corresponds essentially to the oblique orientation of the contact faces of the pipe hub end. In the illustrated example, the contact face forms an angle 38 which is about 65 degrees, but many variants of this angle are conceivable.

Furthermore, the lips 32 are made with an entering portion 37 in the transition between an inner point of the lip and the obliquely oriented contact face 34. The entering portion 37 has an entering radius which forms a tangent to the obliquely oriented contact face 34. This entering portion preferably has a radius of about 40 millimeters in the case of a clamp with an internal diameter of about 250 millimeters. Naturally, this will change with varying clamp size. This is done to ensure that the clamping member 2, when closed, will not have a very sharp edge that meets the contact face on the pipe hub end. A very sharp edge could dig into the contact face and cause problems in obtaining a good connection.

Figure 9:
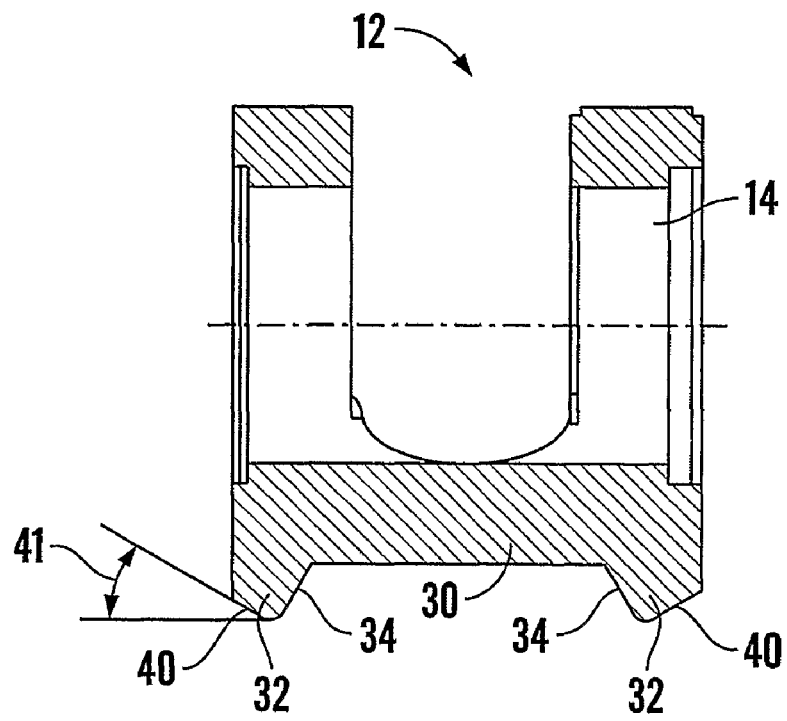
FIG. 9 is a sectional view taken along the line C-C of the pipe clamping member shown in FIG. 6.

FIG. 9 shows another section of the clamping member 2, taken along the line C-C in FIG. 6, this means to say, taken in a portion of the pipe hub end where the lip has a circular sector radius. It can be seen here that the clamping member has a through slot 12 and a hole 14 at right angles to each other as a part of the securing device. Furthermore, it is shown that the inner profile comprises a bottom portion 30 and two lips 32, where the bottom portion and the lips have been joined together via the two obliquely oriented contact faces 34. It can also be seen that this section of the clamping member 2 is made having a guide face 40 which forms an angle 41 with the centre axis.

Figure 10:
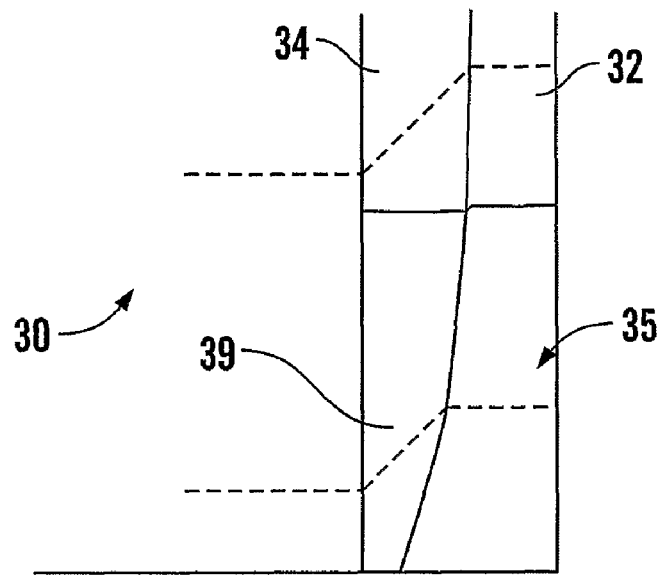
FIG. 10 is a schematic diagram of the projection of the interior form of a first embodiment of the invention.
Figure 11:
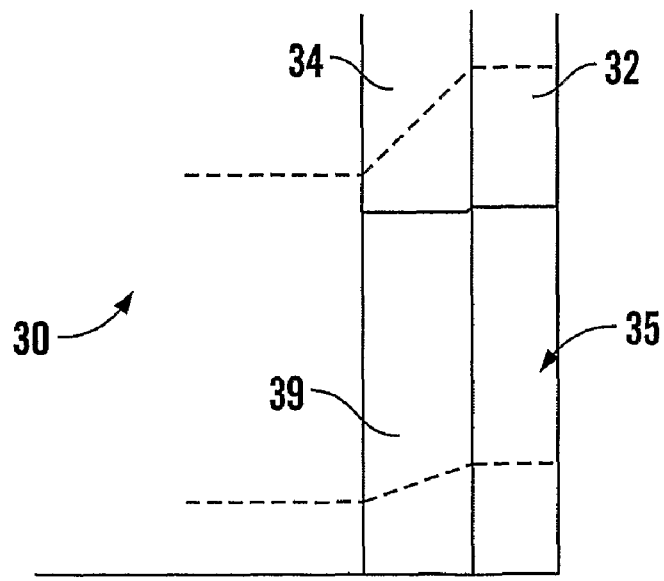
FIG. 11 is a schematic diagram of the same as in FIG. 10, but according to a preferred embodiment of the invention.

FIG. 10 and FIG. 11 are drawings showing lines for the transition between the lip 32 that runs into the lip in the circular sector portion 35 which has a different inner radius for the lip. These figures also show lines for the transition between the lip 32 and the contact face 34, the transition between the lip in the circular sector 35 and the contact face 34 and the transition between the contact face 34 and the bottom portion 30. These lines are viewed radially outwards towards a transition between a lip radius and a circular sector radius which is projected onto plane at right angles to the radius. Two broken lines have also been included in each figure to illustrate the profile of the transition between the bottom portion and the lip for an area outside the circular sector portion and the area within the circular sector portion. FIG. 10 shows an embodiment where nothing special has been done with the lines to improve the use of the clamp, but FIG. 11 shows the preferred embodiment of the clamping member where the transitional line between the lip and the contact face has been manipulated so that it forms an almost straight line, also in the transition from a lip radius to a circular sector radius that is greater than the lip radius.

The plane 39 that is between an inner point of the lip in the circular sector 35 and the bottom portion 30 is a manipulated portion of the contact face 34 in the circular sector 35. This plane 39 is made in the form of a radius and is tangential to the contact face 34. This means that when the two clamp halves are secured together around the pipe end hubs, a contact line is obtained instead of a contact point. This permits the joining of pipe end hubs even if they have an angle between them and the aligning thereof when the pipe clamp is secured together.

The invention has now been explained with reference to exemplary embodiments. Other embodiments and variations which fall within the scope of the invention as defined by the attached claims are conceivable. It is possible that the different physical measurements given can be changed depending on the size of the pipe ends, alternatively the end cover, and other physical factors related to the pipe clamp and the pipe hub end. It is possible to construct the clamp with two circular sectors per clamp half, but it is also possible to have just one circular sector. The circular sector portions may have straight faces, and an optional centre point does not need to be in proximity to the centre axis of the pipe or the clamp. It is possible to envisage other types of securing devices and hinge joints; for example, the securing device may be arranged in two through holes per lug instead of one hole and a slot as in the illustrated example. The illustrated example shows a clamp with two mirrored clamping members, each forming a circular arc of approximately 180 degrees. It is conceivable that both form a circular arc of less than 180 degrees, or that one forms a circular arc of less than 180 degrees and the other a circular arc of more than 180 degrees. It is possible that the bottom portion has a different shape than a flat face, or that the inner terminating face of the lips is shaped with a different termination than a face.

The invention claimed is:

1. A pipe clamp for securing a first hubbed end portion of a first member to a second hubbed end portion of a second member, the first and second members comprising a common center axis, the pipe clamp comprising:
    two clamping members which each comprise a first end and a second end, the first ends being pivotably connected about a pivot axis which is substantially parallel to the center axis and the second ends being connected by a securing device, the pipe clamp being arranged to press the first and second hubbed end portions against each other when the clamping members are secured together;
    the clamping members each comprising an arcuate, radially inner portion which extends in the longitudinal direction of the clamping member and which in profile comprises a bottom portion, two lips which each extend radially inwardly from a corresponding side of the bottom portion, and two obliquely oriented contact faces which each extend radially outwardly from a corresponding lip towards the bottom portion, each lip including a main portion which extends circumferentially along the inner portion and comprises a lip radius;
    wherein at least one lip of at least one clamping member comprises an arcuate circle sector portion which extends between the main portion and one of the first and second ends and comprises a circle sector radius that is larger than the lip radius; and
    wherein in the closed position of the pipe clamp the contact faces engage the first and second hubbed end portions along substantially the entire lengths of the main and circular sector portions.

2. A pipe clamp according to claim 1, wherein the circle sector radius comprises a center point which lies on or near the center axis when the pipe clamp is in a fully open position.

3. A pipe clamp according to claim 1, wherein each lip of each clamping member comprises a circle sector portion which extends between the main portion and one of the first and second ends and comprises a circle sector radius that is greater than the lip radius.

4. A pipe clamp according to claim 3, wherein each lip of each clamping member comprises a circle sector portion which extends between the main portion and the other of the first and second ends and comprises a circle sector radius that is greater than the lip radius.

5. A pipe clamp according to claim 4, wherein the circle sector radii of the two circle sector portions are the same.

6. A pipe clamp according to claim 5, wherein the circle sector portion extending from the first end traverses an angle of between about 10 degrees and 35 degrees and the circle sector portion extending from the second end traverses an angle of between about 5 degrees and 25 degrees.

7. A pipe clamp according to claim 1, wherein a transition between the lip and the obliquely oriented contact face, seen in a radial direction from the center axis towards an end of the circle sector portion opposite the corresponding first or second end of the clamping member, projected on a plane at right angles to the circle sector radius, forms an apparent straight line.

8. A pipe clamp according to claim 1, wherein at least one clamping member comprises a clamp contact radius which is greater than a hub contact radius of a corresponding hubbed end portion.

9. A pipe clamp according to claim 1, wherein a transition between the lip and the obliquely oriented contact face comprises a rounded surface having a radius in the range of 60 mm to 20 mm.

10. A pipe clamp according to claim 1, wherein at least one of the lips comprises an obliquely oriented guide face which is located on a side of the lip opposite the contact face and which extends radially outwardly at an angle in the range of 15 degrees to 65 degrees.

11. A pipe clamp according to claim 10, wherein the guide face extends radially outwardly at an angle of about 30 degrees.

12. A pipe clamp according to claim 6, wherein the circle sector portion extending from the first end traverses an angle of about 25 degrees and the circle sector portion extending from the second end traverses an angle of about 15 degrees.

13. A pipe clamp according to claim 9, wherein the transition between the lip and the obliquely oriented contact face comprises a rounded surface having a radius of about 40 mm.

* * * * *